Oct. 19, 1965  R. H. RILEY, JR., ET AL  3,213,303
CORDLESS DIRECT CURRENT MOTOR DEVICE UTILIZING
PERMANENTLY-MAGNETIC TUBULAR SEGMENTS
Filed Dec. 4, 1961
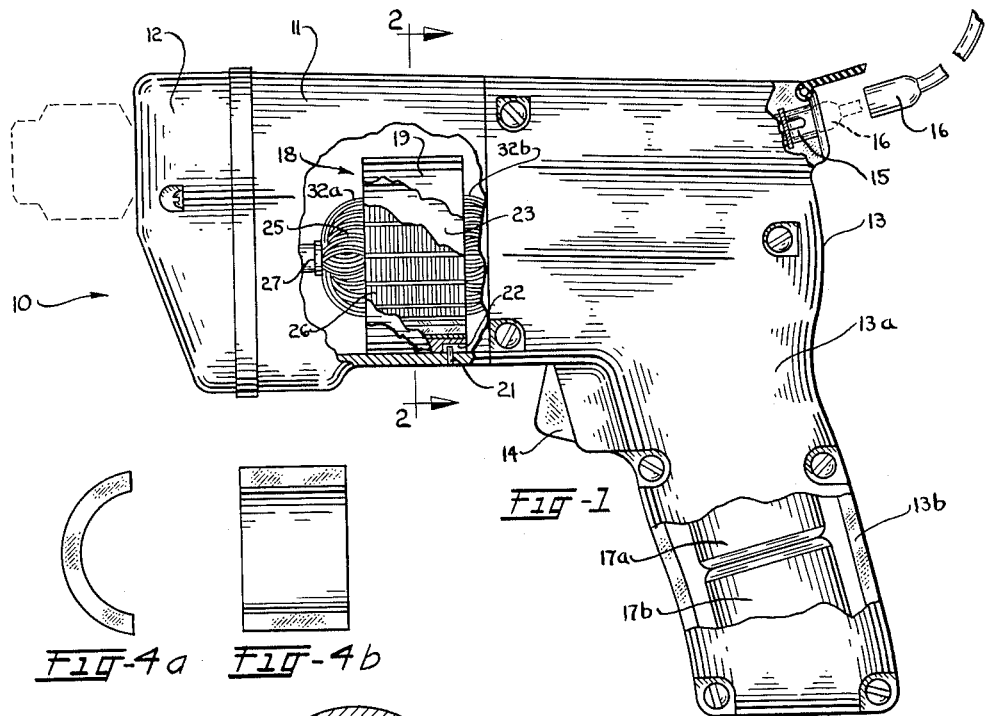
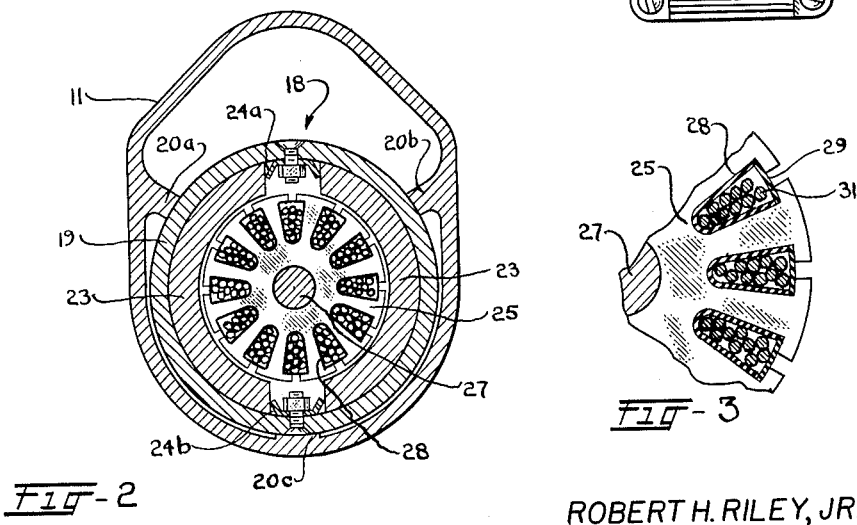
ROBERT H. RILEY, JR.
MELVIN H. NEUHARDT
INVENTORS
BY
Leonard Bloom
ATTORNEY 3,213,303
CORDLESS DIRECT CURRENT MOTOR DEVICE UTILIZING PERMANENTLY-MAGNETIC TUBULAR SEGMENTS
Robert H. Riley, Jr., Towson, and Melvin H. Neuhardt, Baltimore, Md., assignors to The Black and Decker Manufacturing Company, Towson, Md., a corporation of Maryland
Filed Dec. 4, 1961, Ser. No. 156,625
1 Claim. (Cl. 310—50)

The present invention relates to a portable cordless electric device, and more particularly, to a cordless electric drill which utilizes a high-efficiency direct current electric motor comprising a pair of permanently-magnetic tubular segments in combination with a wound laminated armature.

It is an object of the present invention to provide a porable cordless electric drill energized by a series of rechargeable energy cells and having a direct current electric motor, wherein the motor has high-efficiency and relatively-low no-load input current, hence low electrical drain on the energy cells, together with good mechanical strength and ease of assembly.

It is another object of the present invention to provide a portable cordless electric drill utilizing a high-efficiency direct current electric motor, whose field is supplied by a pair of permanently-magnetic tubular segments, and whose speed-torque curve resembles that of a universal motor.

It is yet another object of the present invention to provide a portable cordless electric drill whose direct-current motor is lighter in weight and less expensive than those motors utilized in the prior art.

In accordance with the teachings of the present invention, there is herein illustrated and described a portable cordless electric tool comprising a motor housing, a direct current electric motor in said motor housing, said motor comprising a sleeve, a pair of permanently-magnetic tubular segments retained within said sleeve diametrically opposite to one another, a wound laminated armature rotating concentrically within said sleeve, an an armature shaft journaled for rotation in said motor housing, means to position said sleeve radially and circumferentially within said motor housing, a housing secured to said motor housing and having a portion serving as a handle for the tool, a rechargeable battery within said last-named housing, and a manually-manipulatable control switch for energizing the motor from said battery.

These and other objects of the present invention will become apparent from a reading of the following specification, taken in conjunction with the enclosed drawings, in which:

FIGURE 1 is a side elevational view of a portable cordless electric drill, with parts broken away and sectioned to illustrate the high-efficiency direct current electric motor in the cylindrical motor housing, as well as the series of rechargeable energy cells in the pendant handle portion;

FIGURE 2 is a sectional view taken along the lines 2—2 of FIGURE 1 and illustrating the motor construction and its mounting within the drill;

FIGURE 3 is an enlarged view of a portion of FIGURE 2, showing the individual turns of the coils in the insulated winding slots of the armature;

FIGURE 4a is an end elevational view of one of the permanently-magnetic tubular segments utilized in the motor; and FIGURE 4b is a front elevational view thereof.

With reference to FIGURE 1, there is illustrated a portable cordless electric drill 10 with which the teaching of the present invention may find more particular utility, although it will be appreciated by those skilled in the art that the present invention is equally applicable to a wide variety of cordless electric tools, appliances, and related devices. With this in mind, the drill 10 comprises a substantially cylindrical motor housing 11, a gear housing 12 secured forwardly thereof, and a split-housing handle portion 13 secured rearwardly of the motor housing 11 and including a pair of complementary mating halves 13a and 13b detachably secured together. The handle portion 13 carries a finger-actuated trigger 14; and the handle 13 includes a recharger cord receptacle 15, which is adapted to be engaged by a recharger plug 16 in a manner understood by one skilled in the art. Moreover, the handle 13 houses a series of rechargeable energy cells, two of which are denoted as at 17a and 17b while the motor housing 11 includes a high-efficiency direct current electric motor denoted generally as at 18. The overall structure and operation of the drill 10, together with its method of assembly, comprises an improvement upon the co-pending Butler et al. application Ser. No. 102,819, filed April 13, 1961, entitled "High-Efficiency Cordless Electric Drill," and assigned to the assignee of the present invention.

With reference to the drawings, the motor 18 includes an outer concentric stationary sleeve 19, which is located radially within the motor housing 11 by means of lands 20a, 20b, and 20c (see FIGURE 2), and which is located circumferentially within the motor housing 11 by means of a stationary pin 21 carried by the motor housing 11 and received within a peripheral longitudinal slot 22 formed on the sleeve 19, as shown in FIGURE 1. However, other means of locating the sleeve 19 are contemplated within the scope of the present invention.

The field of the motor 18 is supplied by means of a pair of permanently-magnetic tubular segments 23, which are formed (preferably, but not necessarily) from a suitable ceramic material, such as barium ferrite, which serves as a carrier or matrix for the finely-divided powdered ferrite particles entrapped therein. The segments 23 are dimensionally identical to each other and are formed as a portion of a tube or sleeve by a longitudinal plane passing parallel to the axis of the tube, the shape and proportions of the segments 23 being shown in FIGURES 4a and 4b.

Means are provided for securing the segments 23 within the sleeve 19. Such means may comprise a pair of spring retaining members 24a and 24b secured to the outer sleeve 19 and disposed circumferentially intermediate of the segments 23. Further details of the spring retaining members 24a and 24b may be obtained in the co-pending Neuhardt et al. application Ser. No. 142,181, filed October 2, 1961, entitled "Permanent Magnet Subassembly," and assigned to the assignee of the present invention. Under some circumstances, however, the segments 23 may be adhesively secured within the sleeve 19, it being understood that the means for retaining the segments 23 in the sleeve 19 forms no part of the present invention. Moreover, instead of the segments 23, a complete ceramic ring could be used.

The segments 23 are disposed diametrically opposite from one another, and a wound laminated armature 25 rotates concentrically between the segments 23. In a preferred embodiment of the present invention, the armature 25 includes a stack of laminations 26—numbering approximately fifty-four—which are carried by the armature shaft 27. Each lamination is approximately 0.0185 inch thick and is formed from electrical-grade steel or other low iron-loss silicon steel, while the total length of the stack of laminations 26 (in the preferred embodiment) is substantially equal to the axial length of the segments 23. Moreover, the laminations 26 of the armature 25 have a plurality of circumferentially-spaced peripheral winding slots 28—preferably twelve in all—which have suitable insulation 29 disposed therein.

Each of the winding slots 28 of the armature 25 is adapted to cooperate (preferably) with two other winding slots to have, respectively, a pair of coils wound therebetween; and in a preferred embodiment, each of the coils has a total of 5 turns of No. 18 magnet wire, meaning therefore, that a total of 10 individual wires, as at 31 in FIGURE 3, are disposed within each of the insulated winding slots 28. Also, it will be appreciated that all of the coils are overlapped with respect to each other, see FIGURE 1, with the result that the end portions of all the coils (denoted as at 32a and 32b in FIGURE 1) project fore and aft beyond the flat axial faces of the segments 23.

Obviously, many modifications may be made without departing from the basic spirit of the present invention; and accordingly, within the scope of the appended claim, the invention may be practiced other than has been specifically described.

We claim:
A cordless portable electric tool comprising:
(a) a motor housing;
(b) a direct current electric motor in said motor housing;
(c) said motor comprising a sleeve, a pair of permanently-magnetic tubular segments retained within said sleeve diametrically opposite to one another, a wound laminated armature rotating concentrically within said sleeve, and an armature shaft journaled for rotation in said motor housing;
(d) means to position said sleeve radially and circumferentially within said motor housing;
(e) a housing secured to said motor housing, and means on one of said housings serving as a handle for the tool;
(f) a rechargeable battery within said last-named housing; and
(g) a manually-manipulatable control switch for energizing the motor from said battery.

References Cited by the Examiner
UNITED STATES PATENTS

| | | | |
|---|---|---|---|
| 873,123 | 12/07 | Gardy | 310—50 |
| 1,644,718 | 10/27 | Fitzgerald | 310—206 |
| 2,479,455 | 9/49 | Aronoff | 310—154 |
| 2,513,227 | 6/50 | Wylie | 310—154 |
| 2,829,285 | 4/58 | Steiner et al. | 310—50 |
| 2,876,369 | 3/59 | Doerner | 310—50 |
| 3,027,507 | 3/62 | Hubner | 320—2 |

FOREIGN PATENTS 1,082,665  6/60  Germany.

MILTON O. HIRSHFIELD, *Primary Examiner.*

Disclaimer 3,213,303.—*Robert H. Riley, Jr.*, Towson, and *Melvin H. Neuhardt*, Baltimore, Md. CORDLESS DIRECT CURRENT MOTOR DEVICE UTILIZING PERMANENTLY-MAGNETIC TUBULAR SEGMENTS. Patent dated Oct. 19, 1965. Disclaimer filed Nov. 7, 1973, by the assignee, *The Black and Decker Manufacturing Company*.

Hereby enters this disclaimer to the said claim of said patent.

[*Official Gazette February 5, 1974*]